UNITED STATES PATENT OFFICE.

WILHELM HERZBERG AND MAX RONUS, OF BERLIN, AND FRANZ SCHWABE, OF CHARLOTTENBURG, GERMANY, ASSIGNORS TO ACTIEN GESELLSCHAFT FÜR ANILIN FABRIKATION, OF BERLIN, GERMANY.

MONOAZO DYE.

1,008,907.  Specification of Letters Patent.  Patented Nov. 14, 1911.

No Drawing. Application filed June 12, 1911. Serial No. 632,701.

*To all whom it may concern:*

Be it known that we, WILHELM HERZBERG, MAX RONUS, and FRANZ SCHWABE, the first and third named subjects of the King of Prussia, the second named a citizen of Switzerland, residing at (the first and second named) Berlin, W., Germany, and (the third named) Charlottenburg, near Berlin, Germany, our post-office addresses being Landshuterstrasse 24, Berlin, W., Germany; Schöneberger Ufer 36ª, Berlin, W., Germany, and Berlinerstrasse 23, Charlottenburg, near Berlin, Germany, respectively, have invented certain new and useful Improvements in Monoazo Dye, of which the following is a specification.

We have found that new valuable red monoazo-dyes are obtained, which dye wool from an acid bath red tints, which are distinguished by their leveling power and excellent fastness to light, acids and steaming. These new dyes are manufactured by combining the 4-nitrodiazobenzene-2-sulfonic acid with a 1.3-diaminobenzene-5-sulfonic acid, substituted in the 2-position by a negative substituent. Such compounds are 1.3-diamino-2-halogenbenzene-5-sulfonic acids and 1.3-diaminobenzene-2.5-disulfonic acid.

The following examples illustrate the invention, without, however, limiting it; the parts are by weight:

Example 1: The diazo-compound made from 21.8 parts of 4-nitranilin-2-sulfonic acid is mixed with 22.2 parts of 1.3-diamino-2-chlorobenzene-5-sulfonic acid and then the excess of hydrochloric acid is neutralized by the addition of sodium acetate. When the reaction is complete, the dye is salted out, filtered and dried. It forms in the dry shape a bluish-red powder, easily soluble in water to a red solution, which is not altered by an alkali or by acetic acid, but which turns to yellow by addition of hydrochloric acid. The solution in concentrated sulfuric acid is red. By action of strong reducing agents 1.4-phenylenediamin-sulfonic acid and 1.3.4-triamino-2-chlorobenzene-5-sulfonic acid are obtained. The dye produces on wool from an acid bath red tints of very good fastness.

Example 2: The diazo-compound from 21.8 parts of 4-nitranilin-2-sulfonic acid is combined in the presence of sodium acetate with 26.8 parts of 1.3-diaminobenzene-2.5-disulfonic acid. One proceeds as above. The dyestuff shows the same properties, but its reduction products are 1.4-phenylenediamin-sulfonic acid and 1.3.4-triaminobenzene-2.5-disulfonic acid.

What we claim, is,—

1. As new articles of manufacture the herein-described new monoazo-dyes, derived from 4-nitrodiazobenzene-2-sulfonic acid and 1.3-diaminobenzene-5-sulfonic acid, substituted in the 2-position by a negative substituent, which dye wool from an acid bath red tints, and which dyes are in the dry and pulverized shape, generally speaking, red powders, soluble in water to a red solution, which is not altered by an alkali or by acetic acid, but which turns to yellow by addition of hydrochloric acid; which dyes are soluble in concentrated sulfuric acid to a red solution and which dyes are split off when treated with strong reducing agents, yielding 1.4-phenylenediamin-sulfonic acid and 1.3.4-triaminobenzene-5-sulfonic acid, substituted in 2-position by a negative substituent.

2. As a new article of manufacture the herein-described new monoazo-dye derived from 4-nitrodiazobenzene-2-sulfonic acid and 1.3-diaminobenzene-2.5-disulfonic acid, which dyes wool from an acid bath red tints, and which dye is in the dry and pulverized shape a red powder, soluble in water to a red solution, which is not altered by an alkali or by acetic acid, but which turns to yellow by addition of hydrochloric acid, which dye is soluble in concentrated sulfuric acid to a red solution, and which dye is split off when treated with strong reducing agents, yielding 1.3.4-triaminobenzene-2.5-disulfonic acid and 1.4-phenylenediamin sulfonic acid.

In testimony whereof we have hereunto set our hands in presence of two subscribing witnesses.

WILHELM HERZBERG.
MAX RONUS.
FRANZ SCHWABE.

Witnesses:
HENRY HASPER,
WOLDEMAR HAUPT.